United States Patent [19]

Emmett et al.

[11] 4,233,570
[45] Nov. 11, 1980

[54] TUNABLE, RARE EARTH-DOPED SOLID STATE LASERS

[75] Inventors: John L. Emmett, Pleasanton; Ralph R. Jacobs, Livermore; William F. Krupke, Pleasanton; Marvin J. Weber, Danville, all of Calif.

[73] Assignee: The United States of America as represented by the United States Department of Energy, Washington, D.C.

[21] Appl. No.: 868,633

[22] Filed: Jan. 11, 1978

[51] Int. Cl.$^3$ ............................................. H01S 3/16
[52] U.S. Cl. .......................... 331/94.5 F; 331/94.5 P
[58] Field of Search ...................... 331/94.5 F, 94.5 P

[56] References Cited

U.S. PATENT DOCUMENTS 4,132,962  1/1979  Yang et al. ...................... 331/94.5 F

OTHER PUBLICATIONS

Kaplyanskii et al., The Spectra of Divalent Rare Earth Ions in Crystals of Alkaline Earth Fluorides (II Europium and Ytterbium), Optics and Spectra 13, (1962), pp. 129–132.
Blasse et al., Investigation of Some $Ce^{3+}$-Activated Phosphors, J. Chem. Phys. 47 (1967), pp. 5139–5145.
Weber, Nonradiation Decay from 5d States of Rare Earth in Crystals Solid State Communications 12 (1973), pp. 741–744.
Elias et al., Excitation of U.V. Fluorescence in $LaF_3$ Doped with Trivalent Cerium and Praseodymium, Phys. Rev. B 8 (1973), pp. 4989–4995.
Pisarenko et al., Luminescence of $Ce^{3+}$ in NaF at Low Temperatures, Part 1, Optics and Spectroscopy 38 (1975), pp. 51–53.
Pisarenko et al., Luminescence of $Ce^{3+}$ in NaF at Low Temperatures, Part 2, Optics and Spectroscopy 39 (1975), pp. 522–524.
Yang et al., VUV Fluorescence of $Nd^{3+}$, $Er^{3+}$, and $Tm^{3+}$-Doped Trifluorides and Tunable Coherent Sources from 1650 to 2600 A°., Appl. Phys. Lett. 29 (1976), pp. 499–501.
Abbruscato, Optical and Electrical Properties of $SrAl_2O_4$: $Eu^{2+}$., J. of Electrochemical Society 118 (1971), pp. 930–933.

Primary Examiner—William L. Sikes
Attorney, Agent, or Firm—James E. Denny; Roger S. Gaither; P. Martin Simpson, Jr.

[57] ABSTRACT

Laser apparatus comprising combinations of an excimer pump laser and a rare earth-doped solid matrix, utilizing the 5d-4f radiative transition in a rare earth ion to produce visible and ultra-violet laser radiation with high overall efficiency in selected cases and relatively long radiative lifetimes.

7 Claims, 4 Drawing Figures

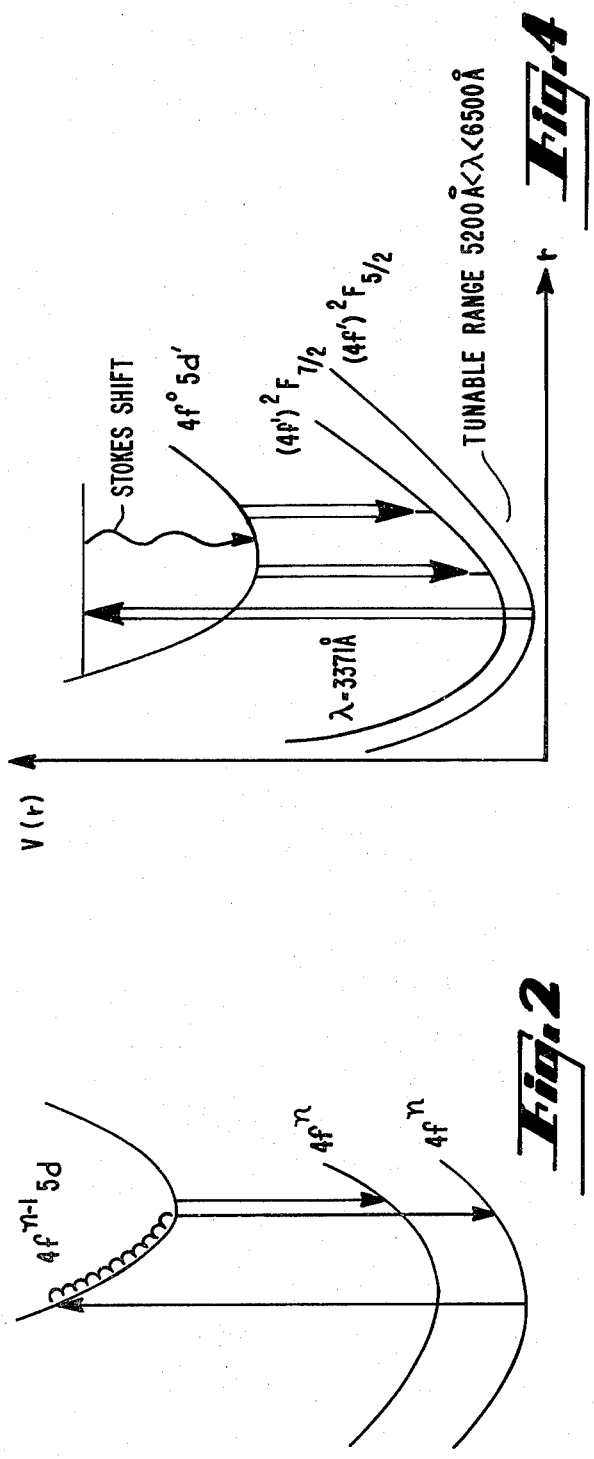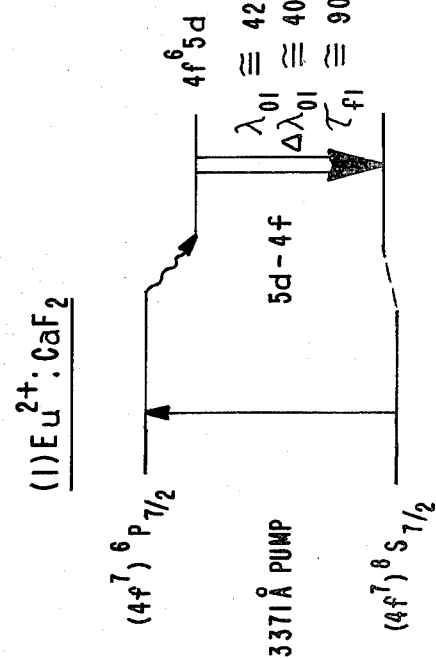

TUNABLE, RARE EARTH-DOPED SOLID STATE LASERS

BACKGROUND OF THE INVENTION

The invention described herein was made at Lawrence Livermore Laboratory in the course of, or under, Contract W-7405-ENG-48 between the United States Department of Energy (formerly U.S. Energy Research and Development Administration) and the University of California.

FIELD OF THE INVENTION

This invention pertains to solid state lasers using rare earth radiative transitions.

Conventional rare earth-doped solid state lasers utilize the 4f-4f radiative transition in the rare earth ion. This transition is theoretically forbidden in the electric dipole approximation, but the ligand field of the crystal or solid matrix interacts with the rare earth ion, causing the transition to become partially allowed. The 4f shell in a rare earth atom or ion is buried beneath the $5s^2$-$5p^6$ subshell so that the 4f-4f transition is only minimally affected by the host lattice. Because the radiative transition is only partially allowed, the 4-4f transitions in rare earths have relatively long radiative lifetimes; $Nd^{3+}$, for example has an associated lifetime of the order of hundreds of microseconds ($\mu$sec) when exited by light of wavelength $\lambda \lesssim 0.9$ microns ($\mu$m).

Another interesting class of rare earth transitions, which forms part of the subject invention here, is the 5d-4f radiative transition(s). These transitions are allowed in the dipole approximation, and one anticipates large associated oscillator strengths and substantial radiative intensities from such decays.

Kaplyanskioi and Feofiloy, 13 Optics and Spectroscopy 129 (1962, English transl.), have studied the spectra of divalent rare earth ions in alkaline earth fluorides such as $CaF_2$, $BaF_2$ and $SrF_2$ and have found two broad absorption bands in the near-ultraviolet for both $Eu^{2+}$:$MeF_2$ $Yb^{2+}$:$MeF_2$, where Me is a suitable alkaline earth. The lifetimes, especially in $Yb^{2+}$:$CaF_2$, were found to be very long (hundreds of microseconds), possibly due to decay from metastable states in a $4f^n-{}^1 5d \to 4f^n$ transition.

Blasse and Bril, 47 Jour-Chem Phys. 5139 (1967), have investigated fluorescence in $Ce^{3+}$-activated phosphors, for example $Ce^{3+}$:$Y_3Al_5O_{12}$ and $Ce^{3+}$:$SrY_2O_4$. The crystal field splitting of the 5d level was found to vary strongly with the host lattice, and the 5d-4f transitions were found to have radiative lifetimes less than 100 nanoseconds. The half widths of the emission bands were found to be $\sim 4000$ cm$^{-1}$, and in some instances two separate emission bands are extant.

Weber, 12 Solid State Communications 741 (1973) has investigated nonradiative decay for both 5d-4f and 5d-5d transitions in trivalent rare earth-doped $Y_3Al_5O_{12}$, with special concern for $Ce^{3+}$ and $Pr^{3+}$. Nonradiative lifetime was found to increase with energy gap. In particular, $Nd^{3+}$ and $Tb^{3+}$, with low lying 5d levels very close to high lying 4f levels, manifest very fast nonradiative relaxation.

Elias, Heaps and Yen, 8B Phys. Rev. 4989 (1973), have performed fluorescence studies in $LaF_3$ doped with $Ce^{3+}$ and $Pr^{3+}$, where the 5d absorption bands occur in the vacuum ultraviolet ($\lambda = 1200$ Å–2100 Å). Measured fluorescence lifetimes for the 5d-4f transition are $\tau \approx 720$ nsec., with broadband emission in the region 2700 Å $< \lambda <$ 4500 Å.

Pisarenko, Potopenko and Popov, 38 Optics and Spectroscopy 51 (1973, English transl.) and 39 Optics and Spectroscopy 522 (1975), have studied low temperature luminescence in $Ce^{3+}$:NaF. Room temperature luminescence life-time for the 4f-4f transitions from $S_o$ are $\tau \approx 120$ $\mu$sec., with a Stark effect splitting of the ground state into $(4f)^2 F_{5/2}$ (lowest) amd $(4f)^2 F_{7/2}$.

Yang and Deluca, 29 Appl. Phys. Lett. 499 (1976) have observed broadband vacuum ultraviolet fluorescence ($\lambda = 1650$ Å–2600 Å) in $Nd^{3+}-$, $Er^{3+}-$ and $Tm^{3+}-$ doped trifluorides such as $LaF_3$, $YF_3$, $LuF_3$ and $LiYF_4$. Radiative relaxation from the 5d band is accompanied by a large Stokes shift (5000-7000 cm$^{-1}$). The radiative lifetimes of the 5d-4f transitions are quite small, being typically about 20 nsec.

SUMMARY OF INVENTION

The subject invention is solid state laser apparatus (and associated method) comprising a transparent solid matrix; a rare earth dopant for the solid, which dopant undergoes 5d-4f radiative transitions from an excited 5d state; and pump means to excite the rare earth into a 5d absorption band, from which radiative transition occurs. This invention provides a class of solid state tunable lasers, many of which also have lifetimes of the order of microseconds or more and are thus attractive for possible application to laser fusion as well.

Accordingly, one purpose of the subject invention is to provide a class of solid state lasers which are tunable and/or have relatively long radiative lifetimes.

Other objects and advantages of the subject invention will become clear from the detailed description and the accompanying drawings.

BRIEF DESCRIPTION OF THE DRAWINGS

FIG. 2 is a schematic view of electron energy (vertical axis) showing the effect of a sequence of small nonradiative transitions (Stokes shift) within the $4f^n-{}^1 5d$ band, followed by a radiative transition to one of the $4f^n$ levels.

FIG. 3 is a graphical view of 4f and 5d potential energy levels, and the radiative transitions therebetween, for a representative $Ce^{3+}$:YAG solid state laser.

FIG. 4 schematically compares the pump and radiative transitions in solid $Eu^{2+}$:CaF and $Ce^{3+}$:YAG lasers.

DETAILED DESCRIPTION

Figure 1:
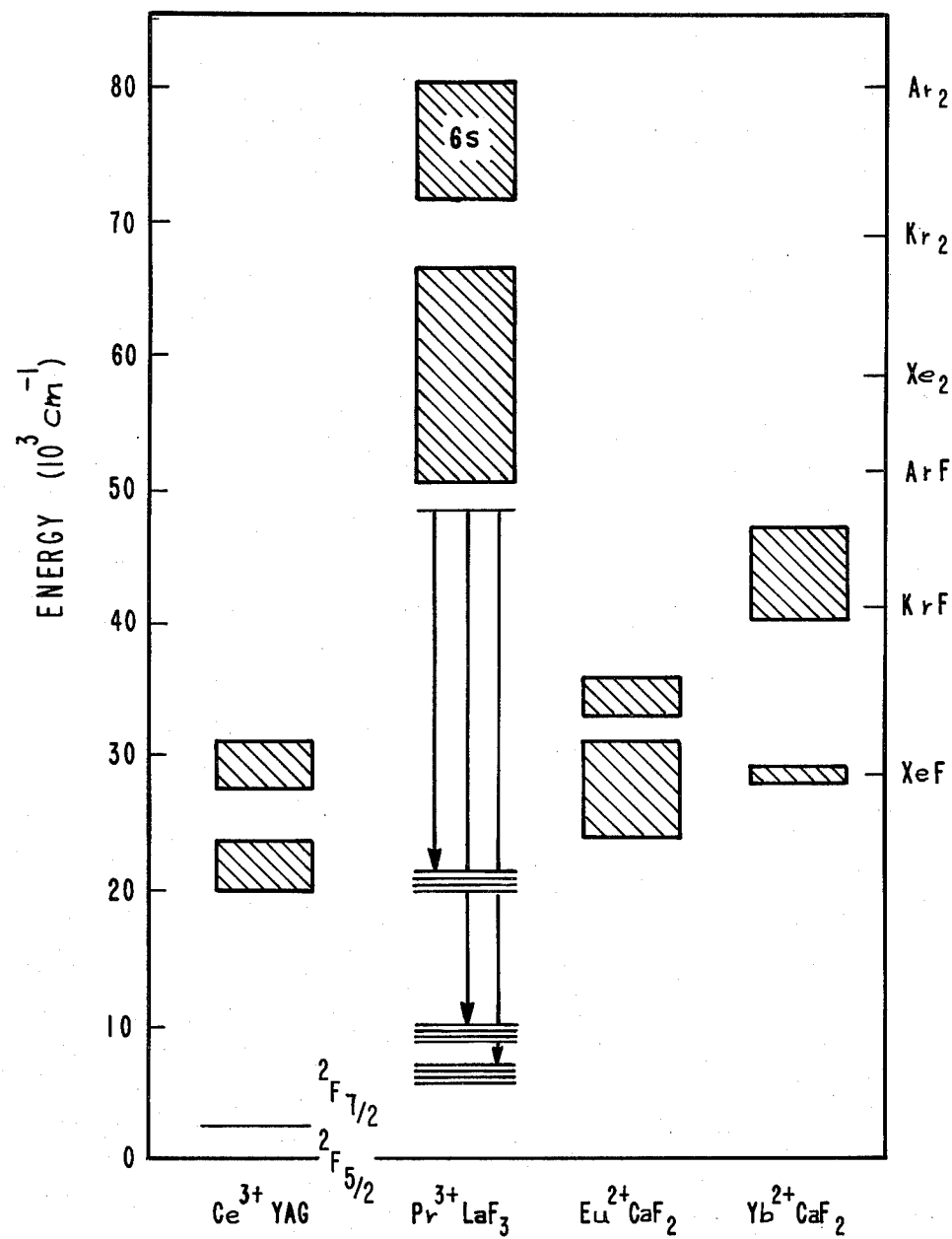
FIG. 1 is a graphical view of energy level diagrams, expressed in wave numbers, showing four candidates for rare earth-doped solid state lasers and excimer lasers which may be used to drive the solid lasers, consistent with the subject invention.

The subject invention utilizes 5-4f transitions, which are allowed in the electric dipole approximation, in rare earth-doped solid state lasers to produce a class of laser which are tunable, have relatively high intensity and have relatively long radiative lifetimes ($\tau_r \gtrsim 1$ $\mu$sec). The solid state lasers may be pumped by efficient rare gas and rare gas-halogen excimer lasers with excimer emissions matched to the appropriate 5d absorption bands of the rare earth ions in the particular host. With the rare earth ion in the excited 5d state, say with configuration $4f^n-{}^1 5d$, the 5d orbital electron is no longer "buried" beneath the $5s^2 5p^6$ subshell, but has instead a characteristic orbital radius comparable with or lying outside the radius corresponding to said subshell. The 4f-5d spectroscopic structure now depends rather strongly on the solid state host and will vary from host to host.

FIG. 1 exhibits four rare earth: solid matrix combinations and the corresponding energy levels (in cm$^{-1}$) of the 5d and 6s absorption bands for these solids, together with the nominal operating energies of six rare gas and rare gas-halogen excimer laser which can be used to drive these solid state lasers. Table 1 exhibits the nominal emission energies (in cm$^{-1}$) of the six excimer lasers, together with some RE-doped solid lasers which may be driven by the excimers through the 5d absorption band. Thus, for example, XeF emission of $\nu = 28,500$ cm$^{-1}$ ($\lambda = 3510$ Å) may be used to raise an electron in the 4f$^n$ configuration in Ce$^{3+}$:YAG or Eu$^{2+}$:CaF$_2$ or Yb$^{2+}$:CaF$_2$ to the 5d absorption band of the respective rare earth ion, where the spectroscopic configuration is now 4f$^{n-1}$5d. The excited electron will now relax nonradiatively, accompanied by a Stokes shift, to the bottom of the 5d band, as shown in FIG. 2, where it will undergo radiative decay to a lower-lying 4f$^n$ state (above the ground state), with the emission of laser radiation as desired. The response of Pr$^{3+}$:LaF$_3$, excited by Xenon dimer radiation at $\nu' = 58,000$ cm$^{-1}$ into the 5d band, is somewhat different: the 5d level in Pr$^{3+}$ appears to relax nonradiatively to an adjacent, high-lying 4f$^n$ level (as suggested in FIG. 1) and then relaxes radiatively to a lower-lying 4f$^n$ level. Further, the Pr$^{3+}$:LaF$_3$ may also be excited by Argon dimer radiation at $\nu' = 79,500$ cm$^{-1}$ into the 6s absorption band for subsequent nonradiative and radiative decay.

Preliminary experiments have been performed by us, utilizing a Ce$^{3+}$:YAG crystal pumped by an N$_2$ laser at $\lambda = 3371$ Å. The RE ground state in Ce$^{3+}$ is (4f)$^2$F$_{5/2}$, and the pump excites a 4f electron into the middle of the 5d absorption band where it decays nonradiatively to the bottom of the band as shown in FIG. 3. A 5d-4f radiative transition then occurs with radiative lifetime $\tau_r \approx 65-75$ nsec and broadband emission centered at $\xi \approx 5500$ Å; this corresponds to a Stokes shift of the peak wavelength of about 4000 cm$^{-1}$. Radiative transition to the (4f)$^2$F$_{7/2}$ is followed by nonradiative decay to the ground state (lower in energy by $\sim 2500$ cm$^{-1}$) as shown in FIG. 3, where the laser transition is denoted by a double arrow and nonradiative transitions are denoted by single wavy arrows. The critical inversion density for laser action in Ce$^{3+}$ in YAG is estimated as $N_c \mp 10^{16}$/cm$^3$ for a sample length of 5 mm, which is easily obtained with the N$_2$ laser excitation source. This corresponds to a threshold energy density of 0.006 Joules/cm$^3$ in Ce$^{3+}$:YAG. Stimulated emission cross section for 5d-4f transition is believed to be $\sigma$(peak)$\approx 2 \times 10^{-18}$ cm$^2$. Processes which compete for optical gain on this transition include excited state absorption of the generated fluorescence, such as 5d-6s (parity forbidden in the dipole approximation).

The ion Ce$^{3+}$ in Ce$^{3+}$:YAG has a single active electron and has two 5d absorption bands, centered at $\lambda = 4600$ Å ($\nu' = 21740$ cm$^{-1}$) and 3400 Å ($\nu' = 29410$ cm$^{-1}$). The emission from the bottom of the 5d band at $\lambda = 5500$ Å has an associated spectral width of $\Delta\nu \approx 1500$ cm$^{-1}$. The 4f$^0$5d'$\rightarrow$(4f)$^2$F$_{7/2}$ transition is used to obtain continuously tunable coherent radiation over the range 5200 Å $< \lambda <$ 6500 Å, using the approach indicated in FIG. 4. The single 4f electron is excited from the ground state (4f)$^2$F$_{5/2}$ to the 5d band, where it decays nonradiatively to the bottom thereof. The minima of the potential curves for (4f)$^2$F$_{7/2}$ and 4f$^0$5d' are shifted (in radial coordinate r) relative to one another so that the radiative decay 4f$^0$5d'$\rightarrow$(4f)$^2$F$_{7/2}$ spans a wavelength range as shown, depending upon the associated instantaneous value of r. It is the breadth of the 5d-4f transitions (in contrast to the sharp 4f-4f transitions) in rare earths which affords the tunability over substantial wavelength ranges.

The $^2$F$_{7/2}$ manifold in Ce$^{3+}$:YAG is virtually unpopulated relative to ground state at room temperature, the associated Boltzmann factor being $6 \times 10^{-6}$. Population inversion relative to this lower state is thus readily achieved. However, the parity-allowed transition 5d-4f has a rather small radiative lifetime (<100 nsec), and this will require substantial pump rates, of the order of 10 kW/cm$^3$, to maintain the inversion at, say, $\lambda = 5500$ Å. Even so, the excited state lifetime for Ce$^{3+}$:YAG is longer by a factor $\gtrsim 10$ than the lifetime for typical organic dyes so that minimum pump rate requirements are reduced by this same factor vis-a-vis conventional tunable dye lasers. Possible pump sources for Ce$^{3+}$:YAG include N$_2$ ($\lambda = 3371$ Å), frequency doubled ruby ($\lambda = 3470$ Å), XeF ($\lambda = 3510$ Å) and Ar.

Lattice absorption of light occurs at wavelengths $\lambda = 2000$ Å in YAG, which should present no heating problem for optical pumping of Ce$^{3+}$ in YAG. The dopant concentration of Ce may be kept low, typical 0.01-1.0%, as the absorption and emission cross sections are high. The emission and absorption spectra in YAG (Y$_3$Al$_5$O$_{12}$) can be shifted by substituting Lu$^{3+}$ or Gd$^{3+}$ for Y$^{3+}$ and Sc$^{3+}$ or Ga$^{3+}$ for Al$^{3+}$.

Trivalent Ce, Tm, Yb and divalent Eu and Yb have large 4f-5d separations ($\nu' \gtrsim 20,000$ cm$^{-1}$), and one expects that these excited rare earth ions will decay radiatively, with lifetimes $\tau \lesssim 100$ nsec. By contrast, traivalent Nd, Pr and Tb have low 5d bands which are in the proximity of high lying 4f levels ($\nu' \lesssim 4000$ cm$^{-1}$) and will probably decay (5d-4f) predominantly nonradiatively therebetween. Weber (1973, supra) has shown that the 5d fluorescence lifetimes are temperature-dependent; with break points at temperatures $T_b \sim 200$-$600°$K, above which the lifetime $\tau$ decreases abruptly with increasing temperature. At lower temperatures, $\tau$ is approximately constant, being about 65 nsec. for Ce$^{3+}$ and 20 nsec. for Pr$^{3+}$. At higher temperatures, even in Ce, Tm, Yb and Eu, nonradiative decay, activated by multiphonon processes, can compete with and even predominate over the desired radiative decay. Thus, low temperature operation is preferred here.

Another system of considerable interest here is Ce$^{3+}$:NaF, which has an absorption band near $\nu' = 40,000$ cm$^{-1}$ which may be pumped by a KrF laser, and has a weaker absorption band at $\nu' = 28,200$ cm$^{-1}$ where XeF laser pumping is possible. Stokes shifted radiative emission from the two 5d levels has associated low temperature lifetimes of 205 $\mu$sec and 240 $\mu$sec; these both drop to 120 $\mu$sec at room temperature, but the lifetimes are sufficiently long to be very attractive for laser fusion applications. The bottom of the 5d absorption band occurs at $\nu' \approx 22,000$ cm$^{-1}$. The absorption spectrum is rather complex, as reviewed by Pisarenko (1975, supra) and consists of one or more narrow bands below 4000 cm$^{-1}$ plus one or two high lying bands with maxima at 35,000 cm$^{-1}$. Radiative emission occurs by 4f$^0$5d'$\rightarrow$(4f)$^2$F$_{7/2}$ at wavelengths $\lambda \approx 4750$ Å and possessing some tunability. The Strokes shift in Ce$^{3+}$:NaF may be greater than 10,000 cm$^{-1}$, which means that the lattice heating will be substantial. The solid matrix NaF manifests a low nonlinear refractive index which may minimize self-focusing problems in the use of $Ce^{3+}$:NaF as an amplifier.

The rare earth ion praesodymium may be used in the forms $Pr^{3+}$:LaF and $Pr^{3+}$:YAG, among others. In $Pr^{3+}$:LaF, the lowest $4f5d'$ level lies above the highest state of the ground configuration ($4f^2$). Excitation into a 5d state by an $Xe_2$ or ArF laser ($\lambda = 1720$ or 1960 Å) or into a 6s state by an Ar laser ($\lambda = 1260$ Å) is followed by nonradiative relaxation to a nearby metastable 4f level, having a measured fluorescence lifetime of 720 nsec and a calculated radiative lifetime of 3.6 $\mu$sec. Laser action occurs by a 4f-4f transition at $\lambda \approx 2700$ Å, and the system may have a threshold power requirement as low as 0.05 Joules/$cm^3$.

The lowest lying excited level in $Pr^{3+}$:YAG, $4f5d'$, lies below the high lying $(4f^2)'S_o$ level but substantially above the $(4f^2)^3P_j$ configuration. Radiative decay via the 5d-4f transition is present, with a fluorescence lifetime $\tau \approx 20$ nsec at $T \lesssim 200°$ K. Pulsed excitation by a KrF laser may produce tunable radiation in the range 3000 Å $< \lambda <$ 4000 Å. The behavior of $Ce^{3+}$ and $Pr^{3+}$ is similar. In $Pr^{3+}$, as in $Ce^{3+}$, the difference between ground and first excited 5d levels is $\sim 7200$–$7500$ $cm^{-1}$, with nonradiative decay lifetimes $\sim 20$ nsec. at low temperatures.

One interesting divalent rare earth system is $Eu^{2+}$:$CaF_2$, which may be excited by the XeF laser ($\lambda = 3150$ Å) to the center of the lowest 5d absorption band from which it ultimately decays radiatively with a lifetime $\tau_r \approx 1$ $\mu$sec. Radiation is centered at $\lambda = 4300$ Å and is tunable, making this laser transition attractive for laser isotope separation applications if tunability over $\Delta\nu' \gtrsim 200$ $cm^{-1}$ is attainable. The absorption spectra of $Eu^{2+}$:$BaF_2$ and $Eu^{2+}$:$SrF_2$ were found by Kaplyanskii et al. (1961, supra), to each consist of two intense wide bands with peaks at approximately $\lambda = 2400$ Å ($\Delta\lambda = 400$ Å) and $\lambda = 3300$ Å ($\Delta\lambda \approx 500$ Å). The ground state of $Eu^{2+}$:$MeF_2$ (any suitable metal fluoride) is $(4f^7)^8S_{7/2}$, and the luminescence spectrum contains several intense narrow bands ($\Delta\lambda \approx 10$ Å) with an extremely large number of weaker diffuse bands which appear to form a continuum. Excited $Eu^{2+}$, in the $4f^65d'$ configuration, apparently decays radiatively directly to ground with emission wavelengths varying from $\lambda = 4000$–5900 Å depending upon the host. The fluorescence lifetime of the 5d-4f transition is $\tau = 0.5$–1.5 $\mu$sec at room temperature and decreases rapidly as temperature increases. Another appealing choice is $Eu^{2+}$:$SrAl_2O_4$, which has been studied briefly by V. Abbruscato, 118 Jour. Electrochem Soc. 930 (1971).

Another example of an attractive divalent rare earth is $Yb^{2+}$:$MeF_2$ with Me=Ca, Ba or Sr. The absorption spectra of $Yb^{2+}$:$MeF_2$ is similar to that of $Eu^{2+}$:$MeF_2$; each consists of two broadbands at $\lambda = 2400$ Å and 3500 Å with spectral widths $\Delta\lambda = 400$ Å. The ground state of $Yb^{2+}$:$MeF_2$ is $(4f^{14})'S_o$, and the excited state of interest is $4f^{13}5d'$. The crystal $Yb^{2+}$:$CaF_2$ undergoes a marked Stokes shift ($\Delta\lambda' \approx 10,000$ $cm^{-1}$) after excitation to the 5d band, with the fluorescence lifetime at the bottom of the lower lying 6s band measured as $\tau \approx 200$ $\mu$sec at low temperatures (T=77° K.). Thus the transition pattern prior to laser action in $Yb^{2+}$:$CaF_2$ may be

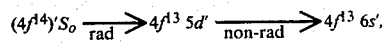

$(4f^{14})'S_o \xrightarrow{rad} 4f^{13}5d' \xrightarrow{non\text{-}rad} 4f^{13}6s'$, according to Kaplyanskii et al. (1961), supra. Transition between $4f^{13}6s^1$, and the ground state $(4f^{14})^1S_o$ is parity-forbidden, which may explain the long lifetime of (what is believed to be) the $4f^{13}6s'$ state. The emitted radiation is centered at $\lambda = 5800$ Å and may be tunable over a few hundred Å. $Yb^{2+}$:$CaF_2$, in particular, may be pumped by either an XeF laser ($\lambda = 3510$ Å) or a KrF laser ($\lambda = 2450$ Å).

Finally, certain 5d-4f and, where applicable, 6s-4f transitions with long lifetimes ($\tau \gtrsim 1$ $\mu$sec) are also suitable for use in laser amplifiers for laser fusion applications.

One embodiment of the present invention may be used in the laser system disclosed in Ser. No. 868,639 by E. V. George et al, "Multiple Excitation Regenerative Amplifier Inertial Confinement System", filed on the same day as this application, assigned to the same assignee, and incorporated by reference herein.

Although the preferred embodiment of the invention has been shown and described herein, it should be clear that modifications and variations may be made without departing from what is regarded as the subject matter of the invention.

We claim:

1. A method for producing tunable laser light in the visible and ultraviolet, the method comprising the steps of:

exciting a rare gas-halogen gas or rare gas dimer so that the gas emits radiation at a wavelengths substantially below $\lambda = 4500$ Å;

directing a portion of the emitted radiation to a solid matrix which is doped by rare earth ion in a fraction 0.1–2.0% numerical density;

causing a substantial number of rare earth ions in the dopant to be excited into a 5d spectroscopic level of the ions by absorption of the emitted radiation;

allowing the excited rare earth ions to decay non-radiatively to an energy level substantially at the lower end of the 5d band that has a radiative lifetime exceeding 65 nsec.;

allowing the excited rare earth ion to decay radiatively from its position substantially at the lower end of the 5d absorption band, with the emission radiation at a wavelength in the wavelength region 1700 Å $< \lambda <$ 5200 Å.

2. A method according to claim 1, wherein said pump gas is drawn from the group consisting of $N_2$, XeF, KrF, ArF, $Ar_2$, $Kr_2$ and $Xe_2$.

3. A method for producing tunable laser light in the visible and ultraviolet, the method comprising the steps of:

exciting a rare gas dimer so that the gas emits radiation at wavelengths substantially below $\lambda = 4500$ Å;

directing a portion of the emitted radiation to a solid matrix which is doped by rare earth ions in a fraction 0.1 to 2.0% numerical density;

causing a substantial number of rare earth ions in the dopant to be excited into a 5d spectroscopic level of the ions by absorption of the emitted radiation;

allowing the excited rare earth ions to decay non-radiatively to an energy level substantially at the lower end of the 5d band;

allowing the excited rare earth ions to decay radiatively from a position substantially at the lower end of the 5d absorption band, with the emission radiation at a wavelength in the wavelength region 1700 Å $< \lambda <$ 5200 Å.

4. Solid state laser apparatus comprising:

a solid matrix of YAG or NaF, which is substantially transparent to radiation in the wavelength range 2400 Å $<\lambda<$ 4000 Å;

a Ce dopant, being present in the solid matrix in a fraction 0.01% to 2% of the numerical density of atoms of the solid matrix, with an ion of the dopant having at least one 5d spectroscopic atomic level lying above the 4f spectroscopic levels of the ion;

pump means to excite a substantial number of Ce ions into an absorption band that contains said 5d spectroscopic level for the ions.

5. Solid state laser apparatus comprising:

a solid matrix that is substantially transparent to radiation in the wavelength range 2400 Å $<\lambda<$ 4000 Å;

a rare earth dopant, being present in the solid matrix in a fraction 0.01% to 2% of the numerical density of atoms of the solid matrix, with an ion of the rare earth dopant having at least one 5d spectroscopic atomic level lying above the 4f spectroscopic levels of the ion;

pump means to excite a substantial number of rare earth ions into an absorption band which contains said 5d spectroscopic level for the ions, with the pump means including a rare gas dimer which, when excited, emits in said wavelength region, the rare gas dimer being selected from the group consisting of $Ar_2$, $Kr_2$ and $Xe_2$.

6. Solid state laser apparatus comprising:

a solid matrix that is substantially transparent to radiation in the wavelength range 2400 Å $<\lambda<$ 4000 Å;

a rare earth dopant, being present in the solid matrix in a fraction 0.01% to 2% of the numerical density of atoms of the solid matrix, with an ion of the rare earth dopant having at least one 5d spectroscopic atomic level lying substantially above the 4f spectroscopic levels of the ion;

pump means to excite a substantial number of rare earth ions into an absorption band which contains said 5d spectroscopic level for the ions, with the pump means including the XeF or the $N_2$ molecule.

7. Solid state laser apparatus comprising:

a solid matrix, drawn from the group consisting of $CaF_2$, $BaF_2$, $SrF_2$, $SrAl_2O_4$, which is substantially transparent to radiation in the wavelength range 2400 Å $<\lambda<$ 4000 Å;

a rare earth dopant, drawn from the divalent group consisting of $Eu^{2+}$ and $Yb^{2+}$, being present in the solid matrix in a fraction 0.01% to 2% of the numerical density of atoms of the solid matrix, with an ion of the rare earth dopant having at least one 5d spectroscopic atomic level lying substantially above the 4f spectroscopic levels of the ion; and pump means to excite a substantial number of rare earth ions into an absorption band which contains said 5d spectroscopic level for the ions.

* * * * *